United States Patent Office 3,324,187
Patented June 6, 1967

---

3,324,187
PRODUCTION OF HALOGEN-SUBSTITUTED, UNSATURATED ALCOHOLS
Morton H. Litt, Morristown, and George J. Schmitt, Madison, N.J., assignors to Allied Chemical Corporation, New York, N.Y., a corporation of New York
No Drawing. Filed Dec. 5, 1961, Ser. No. 157,270
10 Claims. (Cl. 260—633)

The present invention relates to new and useful halogen-substituted, unsaturated alcohols and to a process for their manufacture. More particularly, the invention relates to new and useful, fluorine-substituted, olefinic alcohols and to a process for the preparation of said alcohols.

It has been proposed to prepare unsaturated, fluorinated alcohols by treatment of hexafluoroacetone with acetylene magnesium halides. Processes of this type, commonly known in the art as Grignard reactions, are applicable for the preparation of a variety of halogenated, unsaturated alcohols by interaction of halogenated ketones or aldehydes with organomagnesium compounds. These processes are undesirable from a commercial standpoint, however, in view of the necessary utilization of relatively expensive Grignard reagents.

We have now discovered that fluorine-substituted, olefinic alcohols may be economically prepared in high yield by intimately admixing under substantially anhydrous conditions a fluorine-substituted, perhalogenated acetone with an α-olefinic compound having at least three carbon atoms in the olefinic chain.

Preferred perhalogenated acetone possess the general formula

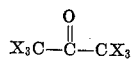

wherein X is a member selected from the group consisting of fluorine and chlorine and the total number of chlorine atoms ranges from 0 to 4.

Illustrative examples of perhalogenated acetones which may be employed include the following compounds

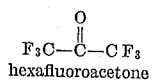
hexafluoroacetone

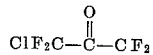
1,1,1,3,3-pentafluoro-3-chloroacetone

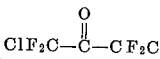
1,3-dichloro-1,1,3,3-tetrafluoroacetone

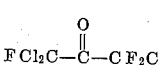
1,3,3-trichloro-1,1,3-trifluoroacetone

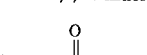
1,1,3,3-tetrachloro-1,3-difluoroacetone

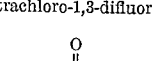
1,1,1-trifluoro-3,3,3-trichloroacetone

Preferred α-olefinic compounds possess the general formula

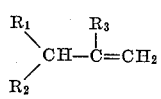

wherein $R_3$ is a member selected from the group consisting of alkyl, cycloalkyl, aryl, aralkyl, alkoxy and aryloxy and $R_1$ and $R_2$ are like or unlike members selected from the group consisting of hydrogen, alkyl, cycloalkyl, aryl, aralkyl, alkoxy, aryloxy, halogen, amido, acyl, carboalkoxy, vinyl and allyl.

Specifically, $R_3$ may be methyl, ethyl, propyl, butyl, cyclohexyl, phenyl, naphthyl, benzyl, methoxy, ethoxy, propoxy and phenoxy. $R_1$ and $R_2$ may be hydrogen, methyl, ethyl, propyl, butyl, phenyl, naphthyl, benzyl, cyclohexyl, methoxy, ethoxy, propoxy, butoxy, phenoxy, chlorine, bromine, fluorine, iodine, acetamido, acetyl, propionyl, carbomethoxy, carboethoxy, carbopropoxy, carbobutoxy, vinyl, and allyl. These radicals, however, are merely illustrative.

Among the aforesaid substituent groups, those derived from hydrocarbon molecules may, in themselves, possess a variety of addtional secondary substituents. The secondary substituents may be any one of the substituent groups, $R_1$, $R_2$ and $R_3$, defined hereinabove. In addition, other secondary substituents may be present provided that the substituents do not appear nearer to the terminal olefinic linkage than on a carbon atom in a position beta to said linkage. Members of this last-named class of substituents may be selected from the group consisting of amino, hydroxy, dialkylamino, diarylamino, dicycloalkylamino and diaralkylamino.

Alternatively, α-olefinic compounds of the above formula wherein $R_3$ is hydrogen or acyloxy (e.g. acetoxy) may be employed. In this instance, $R_1$ and $R_2$ may be like or unlike members selected from the group consisting of hydrogen, alkyl, cycloalkyl, aryl, aralkyl and alkoxy. In addition, $R_1$ and $R_2$ may possess the secondary substituents described above.

Illustrative examples of α-olefinic compounds suitable for the process of our invention are given below.

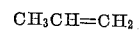
propylene

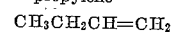
1-butene

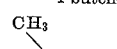
isobutylene

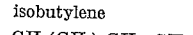
1-decene

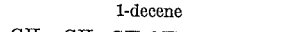
1,5-hexadiene

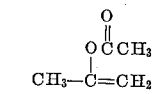
2-acetoxypropene

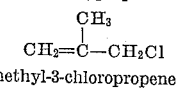
2-methyl-3-chloropropene

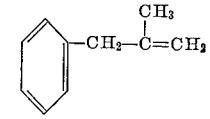
2-benzylpropene

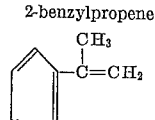
α-methylstyrene

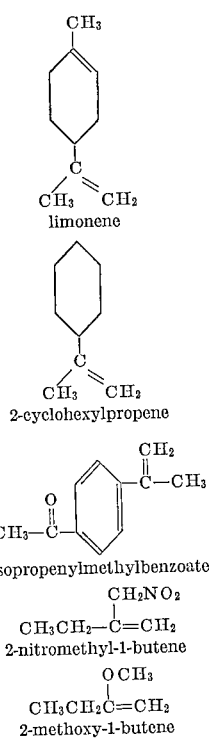

limonene 2-cyclohexylpropene 4-isopropenylmethylbenzoate 2-nitromethyl-1-butene 2-methoxy-1-butene Although we do not wish to be bound by any particular theory, it appears that an alkene compound possessing a terminal olefinic linkage is necessary for a facile reaction rate in our process. The process may be best illustrated by reference to Equation 1, wherein the formation of the fluorine-substituted olefinic alcohols features a migration and retention of the olefinic linkage originally present in the molecule.

(1) 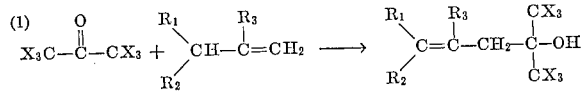

In the equation, the substituent groups, X, $R_1$, $R_2$ and $R_3$, are as defined above.

Alternatively, in those alkene compounds, such as isobutylene and α-methylstyrene, wherein an initial interaction with a fluorine-substituted, perhalogenated acetone results in migration of the alkene linkage from one terminal position to another, the alkene linkage may then function to effect a second condensation reaction with a second perhalogenated acetone molecule to produce a dihydric alcohol. This process may be illustrated by Equation 2, wherein the olefinic compound is isobutylene and X has the above-described meaning.

(2) 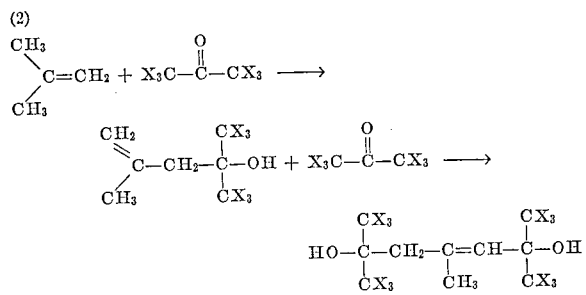

In those alkene compounds which possess two terminal olefinic linkages, it is possible to interact perhalogenated acetones therewith to produce a dihydric, fluorine-substituted olefinic alcohol. Such a process may be illustrated by Equation 3, wherein 1,5-hexadiene is employed as the olefinic compound and X is a halogen as defined above.

(3) 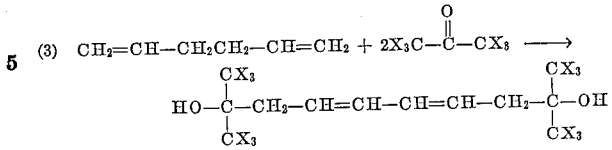

The process of this invention must be conducted under substantially anhydrous conditions. The presence of water or any electron-donating species, such as ammonia or amines or alcohols, will tend to interact with an equivalent number of perhalogenated acetone molecules to form complexes with the molecules, rendering said molecules inactive.

The most convenient manner for excluding extraneous inhibitors is by admixing the perhalogenated actone with concentrated sulfuric acid or other suitable drying agent, and distilling the acetone therefrom, under reduced pressures, if necessary. However, any procedure readily available to those skilled in the art may be employed.

In order to produce a monohydric fluorine-substituted olefinic alcohol from a monoolefinic compound which will not form a dihydric alcohol, a mol ratio of perhalogenated acetone to monoolefinic compound of at least 1:1 is preferred. However, an excess of either reactant may be used depending on the value of the reactant and its ease of separation. The production of a dihydric olefinic alcohol from a monoolefinic compound capable of producing the same requires that the ratio of perhalogenated acetone to monoolefinic compound be at least 2:1. The degree of excess in either instance is not critical and may be as large as economic considerations will permit. Preferably, however, not more than about 3 times the theoretical mol ratio is used in either case. Hence, for production of a monohydric alcohol where formation of no dihydric alcohol is possible, a mol ratio of perhalogenated acetone to monoolefinic compound ranging from 1:1 to about 3:1 is generally employed. For production of a dihydric alcohol from a monoolefinic compound capable of forming the same, the mol ratio may range from 2:1 to about 6:1. In those instances where it is desired to produce a monohydric alcohol from a diolefinic compound or a monoolefinic compound which will form a dihydric alcohol, the converse ratio may be employed, i.e., a mol ratio of perhalogenated acetone to olefinic compound less than 1:1, the ratio being dependent upon the relative reactivity of the olefinic groups but usually ranging from about 0.2 to 0.9:1. For production of a dihydric alcohol from a diolefinic compound, a mol ratio of perhalogenated acetone to diolefinic compound ranging from 2:1 to about 6:1 is generally used.

Care must be exercised when employing α-olefinic compounds containing hydroxy, amino and the like groups in the olefinic molecule inasmuch as the hydroxy and amino moiety of such olefinic compounds may function to inactivate a portion of the perhalogenated acetone present in the reaction mixture. The undesirable reduction in yield predicated by said deactivation may be circumvented by utilization of an excess of the perhalogenated acetone, and, at termination of the process, by utilizing a quantity of mineral acid to rupture the complexes thus formed. The unreacted, perhalogenated acetone may then be separated from the condensation products in the reaction mixture.

Although the preferred temperature range for the reaction is from about 20° to 100° C., temperatures as low as −80° C. and as high as 250° C. are applicable.

In the preferred mode of operation, the process is performed in the absence of any solvent, but, if control of reaction rate is desired, inert organic solvents which will not appreciably inactivate the carbonyl group of the perhalogenated acetones may be used. Suitable solvents include aromatic and aliphatic hydrocarbons such as toluene, benzene, xylene, pentane, hexane, and petroleum ether, as well as ethers such as tetrahydrofuran and nitriles such as acetonitrile. The presence of such solvents acts to slow down the reaction rate of the process by virtue of dilution and complex formation of the solvent with the perhalogenated acetone.

The dihydric, fluorine-substituted, olefinic alcohols of our invention are admirably suitable for the production of epoxy resins as described in Example 10 hereinbelow. The resins may be used as adhesives, as indicated by their high resistance to abrasion, their flexibility, and their resistance to a variety of chemical solvents. Preferred dihydric alcohols may be represented by the following general formula

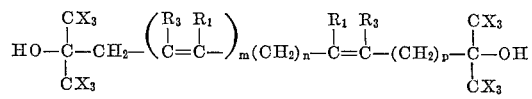

wherein $R_3$ is a member selected from the group consisting of alkyl, cycloalkyl, aryl, aralkyl, alkoxy and aryloxy, $R_1$ is a member selected from the group consisting of hydrogen, alkyl, cycloalkyl, aryl, aralkyl, alkoxy, halogen, amido, acyl, carboalkoxy, vinyl and allyl, X is a member selected from the group consisting of chlorine and fluorine, the total number of chlorine represented by X ranging from 0 to 4, $m$ is an integer ranging from 0 to 1, $n$ is an integer ranging from 0 to 20 and $p$ is an integer ranging from 0 to 1.

Alternatively, $R_3$ may be hydrogen or acyloxy, in which case $R_1$ is a member selected from the group consisting of hydrogen, alkyl, cycloalkyl, aryl, aralkyl and alkoxy.

The monohydric alcohols of the invention are useful as plasticizers for resinous compositions. These alcohols may be esterified and the highly halogenated, inert esters produced therefrom employed for the stabilization of resinous materials against the decompositional effects of heat.

The following specific examples will further illustrate the invention. In the examples, parts are by weight and temperatures are in degrees centigrade.

*Example 1*

Isobutylene (5.6 parts) was distilled under $10^{-5}$ mm. Hg pressure into a thoroughly dried ampule. In a similar manner, hexafluoroacetone (14.2 parts) was added, and the ampule was brought to 0° in an ice bath and sealed. The reaction mixture was maintained at 35–40° for 12 hours, at the end of which time the ampule was opened. A precipitate (18 parts) appeared which was removed by filtration. The filtrate was collected and distilled at 113° under 758 mm. Hg pressure to yield 1,1,1-trifluoro-2-hydroxy-2 - trifluoromethyl-4-methyl - 4-pentene (11.8 parts) of the structure

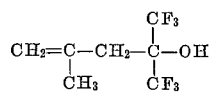

The product was obtained in a yield of 100% of theoretical and possessed a refractive index, $n_D^{25}=1.3503$, and the following elemental analysis:

Theoretical: C, 37.84%; H, 3.62%. Found: C, 37.64%; H, 3.69%.

*Example 2*

The procedure of Example 1 was repeated utilizing 14.0 parts of isobutylene and 83.0 parts of hexafluoroacetone. After standing for 12 hours at 25° in a dry, sealed ampule, the ampule was opened. A solid product was obtained which was recrystallized from chloroform. The product, having the following structural formula, melted at 146–147°.

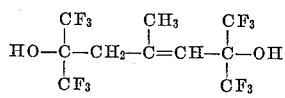

The product exhibited an infrared spectrum wherein the presence of olefinic double bonds was indicated by absorption at 10.35 microns, carbon-hydroxy absorption at 3.0 microns and carbon-fluorine absorption at 8.1–8.4 microns.

*Example 3*

1-butene (13.4 parts) was admixed with hexafluoroacetone (21.5 parts) in the manner described in Example 1. The ampule was permitted to stand at room temperature for 12 hours, and was then cooled to 0° and opened. A liquid residue was obtained (15 parts) which distilled at 65.5–66.5° under 110 mm. Hg pressure to yield a clear distillate of 1,1,1-trifluoro-2 - hydroxy-2-trifluoromethyl-4-hexene possessing a refractive index, $n_D^{25}=1.3475$, and the following structural formula

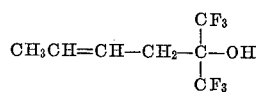

The product had the following elemental analysis:

Theoretical: C, 37.84%; H, 3.62%. Found: C, 37.87%; H, 4.10%.

*Example 4*

Propylene (14 parts) was distilled under vacuum ($10^{-5}$ mm. Hg pressure) into a stainless steel autoclave under anhydrous conditions. In a similar manner, hexafluoroacetone (60 parts) was added, and the bomb was sealed and heated at 145° for 12 hours. Upon cooling, the bomb was opened and the liquid reaction mixture was distilled at 42.8–43.0° under 68 mm. Hg pressure to produce 5.3 parts of 1,1,1-trifluoro-2-hydroxy-2-trifluoromethyl-4-pentene of the following structural formula

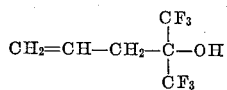

*Example 5*

In a manner similar to that described in Example 1, carefully dried 2-acetoxypropene (10.1 parts) was admixed with hexafluoroacetone (11.4 parts), sealed in an ampule, and heated first at 25° for 56 hours, then at 60° for 15 hours and finally at 100° for 38 hours. The ampule was cooled to 0° in an ice bath and opened. The liquid reaction mixture was washed with water, and then dried over magnesium sulfate. The compound which was isolated, 1,1,1-trifluoro-2-hydroxy-2-trifluoromethyl-4-acetoxy-4-pentene, possessed a refractive index.

$$n_D^{27}=1.3332$$

and the following structural formula

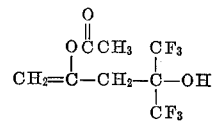

The infrared spectrum of the product had absorption bands at 3.31 and 5.99 microns indicative of olefinic bonds, a band at 2.95 microns indicating the presence of a hydroxy group, a band at 8 microns indicative of the presence of a carbon-fluorine bond and bands at 5.83 and 8.0 microns indicating the presence of a carbonyl group.

*Example 6*

In a manner similar to that described in Example 1, α-methylstyrene (11.8 parts) was admixed with 1,3-dichloro-1,1,3,3-tetrafluoroacetone (19.9 parts) and permitted to stand for 60 hours at 60°. The viscous reaction mixture thereby obtained was distilled at 86–89° under 0.6 mm. Hg pressure to yield 1,1-difluoro-1-chloro-2-difluorochloromethyl-2-hydroxy-4-phenyl-4-pentene which possessed a refractive index, $n_D^{27}=1.4925$, and the following structural formula

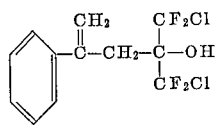

In addition, the infrared spectrum of the product possessed absorption bands at 6.25 and 6.35 microns indicative of a benzenoid nucleus, bands at 12.9 and 14.3 indicating a mono-substituted benzenoid group, a band at 2.84 microns indicative of a hydroxy group, a band from 8.4 to 8.8 microns indicating a carbon-fluorine bond, a band at 6.12 microns indicative of an olefinic group and bands at 3.45 and 6.9 microns indicative of the presence of a methylene group.

Example 7

The process of Example 6 was repeated employing 9.9 parts of α-methylstyrene and 44.7 parts of 1,3-dichloro-1,1,3,3-tetrafluoroacetone. The product had the following structural formula

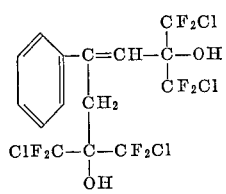

The product exhibited the following elemental analysis:
Theoretical: C, 34.9%; H, 1.94%; Cl, 27.5%. Found: C, 35.19%; H, 2.50%; Cl, 27.0%.

In addition, the product exhibited infrared spectrum showing absorption bands at 6.33 and 6.68 microns indicative of the presence of a benzenoid nucleus, bands at 13.05 and 14.35 microns indicating a mono-substituted benzenoid nucleus, asborption bands from 8.4 to 8.7 microns indicative of a carbon-fluorine bond, a band at 6.09 microns indicative of an olefinic linkage and a band at 2.99 microns indicative of the presence of a hydroxy group.

Example 8

In a manner similar to that described in Example 1, 1,5-hexadiene (8.2 parts) was admixed with 1,3-dichloro-1,1,3,3-tetrafluoroacetone (19.9 parts) and maintained in a sealed ampule for 24 hours at 100°. The mixture was then distilled on a spinning band column at 43–44° under 0.4 mm. Hg pressure to yield 1,1-difluoro-1-chloro-2-hydroxy-2-difluorochloromethyl-4,7-octadiene (25.3 parts) of the following structural formula

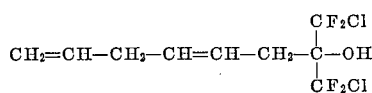

The product possessed a refractive index, $n_D^{27}=1.4395$, and had the following elemental analysis:
Theoretical: C, 38.4%; H, 3.58%. Found: C, 38.01%; H, 3.78%.

Infrared spectrum of the product showed the presence of an absorption band at 2.85 microns indicative of a hydroxy group, a band from 8.4 to 8.8 microns indicating a carbon-fluorine bond and a band at 3.25 and 6.1 microns indicative of an olefinic linkage.

Example 9

The procedure of Example 8 was repeated with 4.1 parts of 1,5-hexadiene and 29.9 parts of 1,3-dichloro-1,1,3,3-tetrafluoroacetone. A yield of 34.3 parts of 1,1,8,8-tetra(difluorochloromethyl)-1,8-dihydroxy-3,5 - octadiene of the following structural formula was obtained

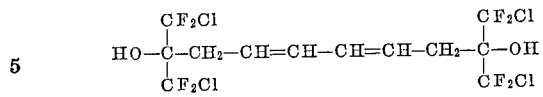

The product possessed a refractive index, $n_D^{27}=1.4574$, and had the following elemental analysis:
Theoretical: C, 30.00%; H, 2.08%; F, 29.4%. Found: C, 30.45%; H, 2.20%; F, 28.56%.

Infrared spectrum of the product showed a hydroxy band at a wave length of 2.83 microns, an absorption band at 8.4–8.75 microns indicative of a carbon-fluorine bond, an absorption band at 3.4 and 6.94 microns indicating the presence of a methylene group and an absorption band at 3.29 and 6.01 microns indicating the presence of olefinic groups.

Example 10.—Preparation of epoxy resin

The dihydric alcohol produced by Example 2 (19.4 parts) was admixed in a resin pot with epichlorohydrin (46.25 parts) and distilled water (0.5 part). The resin pot was equipped with a condenser, a thermowell, a mechanical stirrer and a reagent feed opening. The reaction mixture was agitated and heated at 60° for 30 minutes, at the end of which 1.0 part of sodium hydroxide was added thereto. The temperature was increased to 75° and maintained at that temperature for about 15 minutes, then dropped to 60° at which time additional sodium hydroxide (1.0 part) was added. This procedure was repeated two more times until a total of about 4.2 parts of sodium hydroxide had been added to the reaction mixture. The temperature of said mixture was then raised to 95° and maintained at that temperature for one hour. At the end of this itme, unreacted epichlorohydrin and water were removed from the reaction mixture by distillation at 150° under 90 mm. Hg pressure, and the residue was permitted to cool to about 25°. Acetone (25 parts) was then added to the residue and insoluble salts were removed from the resulting mixture by filtration. The filtrate was collected and acetone was removed therefrom by distillation at 120° under 90 mm. Hg pressure. A clear, water-white liquid was obtained in 60% yield of theoretical based on the monomer added to the initial reaction mixture. The material was an epoxy resin possessing an epoxide equivalent of 298.

This resin was readily transformed into a film by admixing the resin (5 parts) with diethylene triamine (0.35 part) and acetone (20 parts). A cured film was prepared on a bonderized steel panel by heating the above mixture at 95° for one hour. The product obtained possessed the film properties illustrated in Table I.

TABLE I.—PHYSICAL PROPERTIES

| Mandrel Test [1] | Tape Test [2] | Rocker Hardness [3] |
|---|---|---|
| Passed | Passed | 50 |

CHEMICAL PROPERTIES

| 5%NaOH | Water | Toluene | Acetone |
|---|---|---|---|
| No Effect | No Effect | No Effect | No Effect |

[1] ASTM D522-41.
[2] A V-shaped cut was made in the film, and a strip of cellophane tape was pressed down on the film and abruptly ripped away to see if it removed any of the film.
[3] Organic Coating Technology, J. Wiley & Sons, page 642, 1959.

While the above describes the preferred embodiments of this invention, it will be understood that departures may be made therefrom within the scope of the appended claims.

We claim:
1. A fluorine-substituted, olefinic alcohol having the general formula

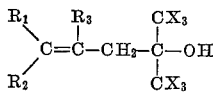

wherein $R_3$ is a member selected from the group consisting of alkyl containing from 1 to 7 carbon atoms, cyclohexyl, phenyl, naphthyl, alkoxy containing from 1 to 4 carbon atoms, methylcyclohexenyl, carbomethoxyphenyl and nitromethyl, $R_1$ and $R_2$ are members selected from the group consisting of hydrogen, alkyl containing from 1 to 7 carbon atoms, benzyl and halogen and X is a member selected from the group cosisting of chlorine and fluorine, the total number of chlorine atoms represented by X ranging from 0 to 4.

2. A fluorine-substituted, olefinic alcohol having the general formula

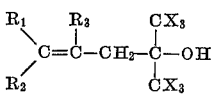

wherein $R_3$ is a member selected from the group consisting of hydrogen and acetoxy, $R_1$ and $R_2$ are members selected from the group consisting of hydrogen, alkyl containing 1 to 7 carbon atoms and allyl and X is a member selected from the group consisting of chlorine and fluorine, the total number of chlorine atoms represented by X ranging from 0 to 4.

3. A fluorine-substituted, olefinic alcohol having the general formula

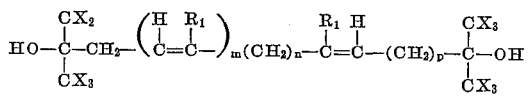

wherein $R_1$ is a member selected from the group consisting of hydrogen, alkyl containing 1 to 7 carbon atoms, phenyl and naphthyl, X is a member selected from the group consisting of chlorine and fluorine, the total number of chlorine atoms represented by X in each

group ranging from 0 to 4, $m$ is an integer ranging from 0 to 1, $n$ is an integer ranging from 0 to 20 and $p$ is an integer ranging from 0 to 1.

4. A fluorine-substituted, olefinic alcohol having the general formula of claim 3 wherein $m$, $n$ and $p$ are 0.

5. A fluorine-substituted, olefinic alcohol having the general formula of claim 3 wherein $m$ and $p$ are 1.

6. The fluorine-substituted, olefinic alcohol having the formula

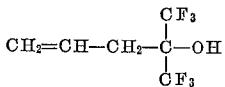

7. The fluorine-substituted, olefinic alcohol having the formula

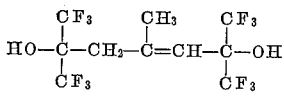

8. The fluorine-substituted, olefinic alcohol having the formula

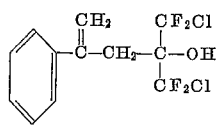

9. The fluorine-substituted, olefinic alcohol having the formula

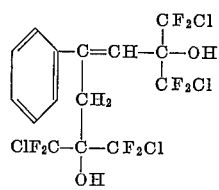

10. The fluorine-substituted, olefinic alcohol having the formula

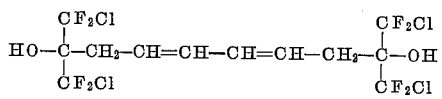

References Cited
UNITED STATES PATENTS

| | | | |
|---|---|---|---|
| 2,490,753 | 12/1949 | Hill et al. | 260—633 X |
| 2,557,639 | 6/1951 | Derr et al. | 260—476 X |
| 2,559,628 | 7/1951 | Joyce | 260—633 |
| 2,666,797 | 1/1954 | Husted et al. | 260—633 |
| 2,824,897 | 2/1958 | Wujciak et al. | 260—633 |
| 2,870,101 | 1/1959 | Stewart | 260—2 |
| 2,914,490 | 11/1959 | Wheelock | 260—2 |
| 2,917,469 | 12/1959 | Phillips et al. | 260—2 |
| 3,140,298 | 7/1964 | England | 260—617 |

OTHER REFERENCES

Knunyants et al.: Chem. Abstracts, vol. 54, p. 20872g (1960).

Young et al.: J. Am. Chem. Soc., vol. 81, pp. 490–3 (1959).

LEON ZITVER, *Primary Examiner.*

LOUISE P. QUAST, *Examiner.*

A. L. LIBERMAN, T. G. DILLAHUNTY,
*Assistant Examiners.*